Nov. 16, 1937.  P. S. NEWTON  2,098,990
THERAPEUTIC LAMP AND METHOD
Filed March 10, 1934
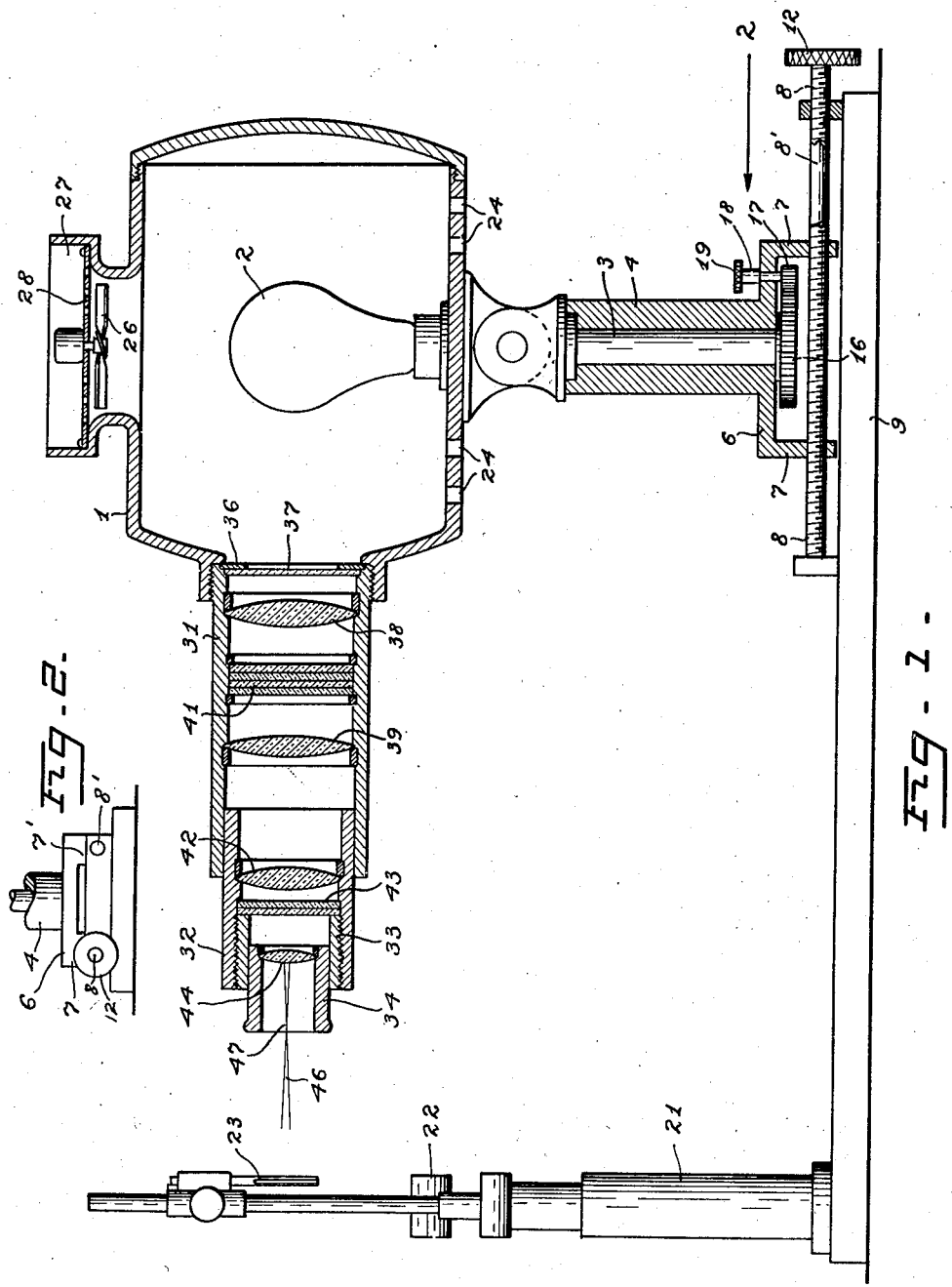
INVENTOR.
PHILLIP S. NEWTON
BY Charles M Fryer
ATTORNEY Patented Nov. 16, 1937

2,098,990

UNITED STATES PATENT OFFICE 2,098,990

THERAPEUTIC LAMP AND METHOD

Phillip S. Newton, Oakland, Calif.

Application March 10, 1934, Serial No. 714,901

6 Claims. (Cl. 128—396)

My invention relates to a therapeutic lamp and method, particularly adapted for pathologic treatment of ailments of the eye.

It is an object of my invention to provide an apparatus and method for treatment of cataracts, although such method and apparatus will successfully treat other constitutional ailments of the eye, such as glaucomo and retinitis.

Other objects of the invention will become apparent from the following description thereof.

I have found that if a concentrated beam or pencil of colored light, substantially free of red color rays and of a diameter substantially the size of the pupil of the eye, is projected through the pupil, improvement, if not an absolute cure, of ailments such as cataract can be obtained. The color is, preferably, substantially pure deep blue; and the purer and deeper the blue, the more efficacious will be the treatment. In obtaining such blue light, it is necessary to filter out substantially all shades of red light which I have found to be injurious to the eye.

Although I have found that deep intense blue light substantially free of all tones of red light, produces the best results, particularly for treatment of cataract, other red-free colored light of a color not harmful to the eye can be utilized to some effect. Red-free light within a color range from blue to blue-green and from blue to purple will produce better results than the colors outside said range. Light anywhere within the range noted and substantially free of red rays, is not harmful to the eye. Within this range light will vary in wave length from 3000 Å. (Angstrom units) to 5000 Å.; the lower limit being about the wave length of purple light and the upper limit being about the wave length of blue-green. As pure deep blue light, which is preferred and produces the best results, has a wave length of about 4600–4700 Å., my preferred concentrated beam or pencil of light will have such wave length.

With respect to the preferred deep and intense blue light, it is a phenomenon that the deeper the blue of the glass for producing the light, the more red tends to pass through the glass. The red rays being injurious to the eye, it is necessary to provide colored glasses, such as blue-green, in combination with the deep blue colored glass, for filtering out all tones of red rays substantially completely.

Following the principles of my invention pointed out above, any suitable combination of lenses and glasses having the desired color, can be employed, to provide the desired color light noted and to form or concentrate the light in a narrow, comparatively solid beam or pencil of a size at the point where it enters the eye, preferably, not greater than the pupil of the eye.

Fig. 1 in the drawing illustrates, in longitudinal vertical section, a form of apparatus and a combination of lenses and glasses of the preferred color for obtaining a deep, intense blue and concentrated beam or pencil of light to be projected into the eye so as to produce a therapeutic effect on the eye.

Fig. 2 is a fragmentary end elevation looking in the direction of arrow 2 in Fig. 1.

Such apparatus comprises housing 1 for light source 2, preferably, in the form of an electric light globe. Housing 1 is pivotally connected to upright rod 3, journaled in tube 4, for angular adjustment in a vertical plane. The lower end of rod 3 projects through mounting table 6 having legs 7 into which screw rod 8 on base 9 is threaded for obtaining longitudinal adjustment of the housing 1, by turning knurled wheel 12 on the end of screw 8. Table 6 has additional legs 7', similar to legs 7, which are slidable over a smooth rod 8', also secured to base 9 for providing stability. In order to provide for rotation of housing 1 about the axis of rod 3, the lower end of the rod has large gear 16 secured thereto and meshing with small gear 17 at the end of rod 18 journaled in mounting table 6; rod 18 having at its upper end knurled member 19 to facilitate turning of the rod.

Thus, it is seen that housing 1 and light source 2 therein are adjustable longitudinally with respect to chin rest standard 21 mounted on base 9, and also adjustable angularly in both a horizontal plane and in a vertical plane. As a result, the beam or pencil of concentrated light can be adjusted so as to be directed in the proper direction into the eye of the patient who has his chin supported on chin rest 22, and has the eye not being treated covered by shutter 23 movably mounted on standard 21.

Light source 2 in housing 1 creates considerable heat in the small confined space formed by the housing. Therefore, cooling means is provided. Such cooling means comprises apertures 24 formed in the bottom of the housing, and electrically operated suction fan 26 mounted in outlet tunnel 27 formed on the top of the housing. Fan 26 is positioned below apertured partition 28 which serves to confine most of the light within housing 1.

Means is provided in the form of a suitable system of convex lenses to collect and intensify the light emitted from source 2, so as to form the concentrated beam or pencil of light, to be projected through the pupil of the eye into the eye ball; it being understood that a pencil of light is a concentrated number of convergent or divergent rays of light emanating from a source. Means is also provided for producing the desired light color. In the preferred form of apparatus, some of the convex lenses are colored to cooperate with other colored glasses, to produce the desired light color.

Fixed to housing 1 is a tube or barrel 31, in the outer end of which is telescopically mounted for slidable movement a smaller tube or barrel 32. The outer end of barrel 32 has sleeve 33 threaded therein; and in sleeve 33 is telescopically mounted for slidable movement therein, a still smaller tube or barrel 34. Adjacent the inner end of barrel 31 is mounted centrally apertured opaque plate 36 of metal or any other suitable opaque material, to cut out peripheral light emanated from source 2, and to thereby provide means for confining the source of light centrally of barrel 31. A plano, deep blue glass plate 37 is positioned in front of opaque plate 36 to produce blue light. Preferably such blue glass 37 is a No. 4 B & L (Bausch and Lomb) plano blue glass.

In front of blue glass plate 37 is fixedly positioned a pair of spaced double convex lenses 38 and 39 which are, preferably, anywhere from 4 inches to 5 inches apart, and provide the first means for concentrating and collecting the light. The rear lens 38, or in other words the lens closest to the light source 2, is, preferably, a No. 20 double convex lens, and is also deep dark blue in color to aid in formation of the desired deep, intense blue light. The preferred color of lens 38 is No. 3 B & L blue.

Lens 39 is, preferably, of No. 16 double convex curvature; and positioned between lenses 38 and 39 is a battery of four plano, blue glasses 41 to cooperate in producing the deep blue light. Preferably, glasses 41 are also of No. 3 B & L blue glass.

Glass 37, lens 38 and glasses 41 produce the desired pure deep blue color; and as previously explained, the deeper the blue glass the more red tends to pass therethrough. Inasmuch as red is injurious to the eye, lens 39 is, preferably, of a color which will aid in filtering out the red light without materially deteriorating the blue. Blue-green glass performs this function; hence lens 39 is of such color and is, preferably, a No. 3 azurine (blue-green) color.

To aid further in concentrating the light from source 2, adjustable barrel 32 is provided with a double convex, uncolored or white lens 42, preferably of No. 20 curvature. Lens 42 is in front of lens 39, and is, preferably, adjustable so as to be positioned anywhere from four inches to five from lens 39. In front of lens 42 and held in position by sleeve 33, is a battery of plano blue-green (preferably No. 3 azurine) glasses 43 to cooperate with blue-green lens 39 in filtering out the red light rays which pass through the deep dark blue glasses. The final lens 44 of the system is mounted in adjustable barrel 34, and is, preferably, adjustable anywhere from one inch to three inches of lens 42, to form the narrow pencil or beam 46 of substantially solid and concentrated blue light in front thereof. Lens 44 is, preferably, of No. 12 double convex curvature, and is of the same color as glasses 43 and lens 39 to aid in the elimination of red rays.

In employing the apparatus, barrels 31, 32 and 34 are so adjusted relative to each other, and housing 1 is moved to such position, as to cause the pencil or beam 46 to enter the pupil of the eye at a size not larger than the pupil, or in other words, not more than four to ten m. m. in width. The focal point 47 of final concentrated beam or pencil 46 is always adjusted to be in front of the eye, preferably about one and one-half to two inches from the eye, because if such focal point should occur within the eye, harmful effects will result. With respect to treating the patient, I have found that each treatment should be no longer than from one-half hour to forty minutes, during which treatment the concentrated, substantially solid light pencil 46 is projected into the eye for about one-half to five minutes at a time, at intervals of from one-half to one minute depending upon the condition of the patient. Pathologic color treatments of the character described, if applied over an extended period of time, will produce a decided improvement, if not a cure, of constitutional ailments of the eye, such as cataract, glaucoma and retinitis.

It will be apparent to those skilled in the art of optics that any number of suitably spaced and formed lenses can be employed to produce the concentrated beam or pencil 46 of light having its focal point in front of the eye. The spacing and curvature of lenses shown in the drawing is merely that of the preferred apparatus which I employ for emitting the preferred substantially red free, deep and intense blue light. Should one desire to emit other light colors, suitable colored glasses can be utilized to produce the desired color, in combination with color glasses, such as blue-green to filter out the red rays.

I claim:

1. In the method of pathologic treatment of the eye, the steps of producing blue light substantially free of red, forming said light in a narrow concentrated beam having a focal point in front of the eye, and causing said beam to enter through the pupil of the eye at a size not larger than the pupil.

2. A method of treating cataract in the eye which consists in projecting into the eye through the cornea and to the crystalline lens thereof a concentrated pencil of light having a wave length of from substantially 3000 Å. to 5000 Å.

3. A method of treating glaucoma in the human eye which consists in projecting into the eye through the cornea and crystalline lens thereof a concentrated pencil of deep blue light.

4. A method of treating retinitis in the human eye which consists in projecting into the eye through the cornea and crystalline lens thereof a concentrated pencil of deep blue light.

5. A pathological treatment of the human eye which consists in projecting into the eye through the cornea thereof a concentrated beam of deep blue light for a period extending up to approximately five minutes, removing the light from the eye for a period up to approximately one minute to allow a reaction from the light stimulation, and repeating such periods of exposure and non-exposure up to approximately one-fourth to three-quarters of an hour.

6. A pathological treatment of the human eye which consists in projecting into the eye through the cornea thereof a divergent pencil of deep blue light having a wave length from substantially 3000 Å. to approximately 5000 Å. for a period of from approximately one-half to five minutes, removing the light from the eye for a period of from about one-half to one minute, and continuing said alternate periods of exposure and non-exposure for a period of approximately one-fourth to three-quarters of an hour daily.

PHILLIP S. NEWTON.